(12) United States Patent  
Chase

(10) Patent No.: US 6,724,991 B1  
(45) Date of Patent: Apr. 20, 2004

(54) BINOCULARLY VIEWABLE HOLOGRAPHIC VIEWFINDER AND CAMERA

(75) Inventor: Scott B. Chase, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/365,888

(22) Filed: Feb. 13, 2003

(51) Int. Cl.$^7$ .............................................. G03B 13/02
(52) U.S. Cl. ...................... 396/375; 396/382; 348/341
(58) Field of Search ................................ 396/373, 375, 396/382; 348/341

(56) References Cited

U.S. PATENT DOCUMENTS

| | | | |
|---|---|---|---|
| 4,165,930 A | 8/1979 | Matsumoto et al. | |
| 4,576,458 A | 3/1986 | Cho et al. | |
| 5,500,702 A | 3/1996 | Meyers | |
| 5,515,392 A | 5/1996 | Teremy | |
| 5,663,815 A | 9/1997 | Molteni et al. | |
| 5,784,182 A | 7/1998 | Francoeur et al. | |
| 5,892,598 A | 4/1999 | Asakawa et al. | |
| 5,893,650 A | 4/1999 | Ohmura | |
| 5,978,607 A | 11/1999 | Teremy et al. | |
| 6,078,423 A | 6/2000 | Orr et al. | |
| 6,125,239 A | 9/2000 | Homma | |
| 6,396,463 B1 | 5/2002 | Tomono | |
| 6,431,768 B1 * | 8/2002 | Nakamura | 396/348 |

* cited by examiner

Primary Examiner—David M. Gray  
(74) Attorney, Agent, or Firm—Robert Luke Walker

(57) ABSTRACT

A camera has a body and a taking lens mounted to the body. The taking lens defines a subject field. A viewing window is joined to the body. The viewing window is transmissive of a light image of the subject field. The viewing window bears a holographic image of a reticle. A light source faces the viewing window and illuminates the holographic image. The reticle produced can be binocularly viewable, that is, viewable by the photographer with both eyes while the photographer looks through the viewing window to compose a scene image for picture taking.

25 Claims, 11 Drawing Sheets

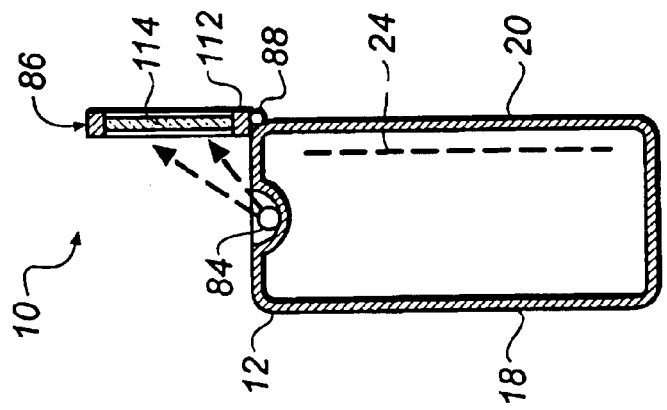
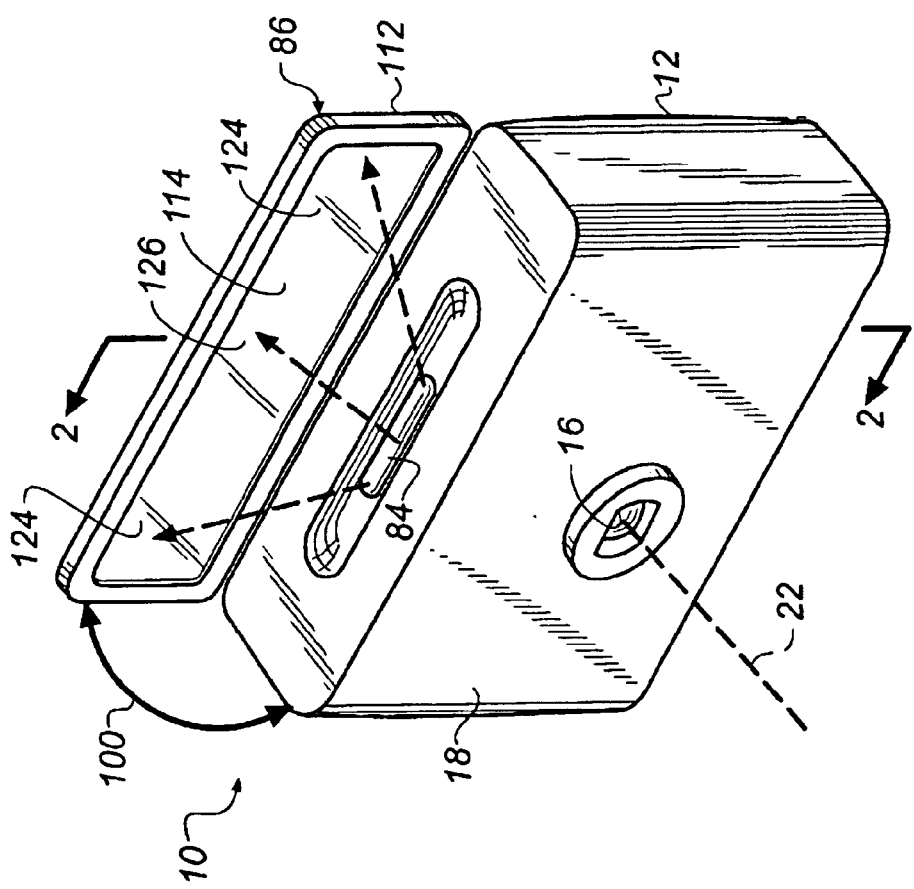

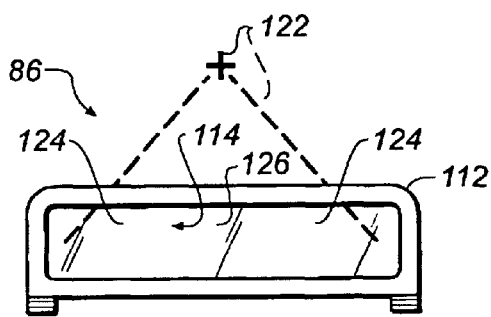
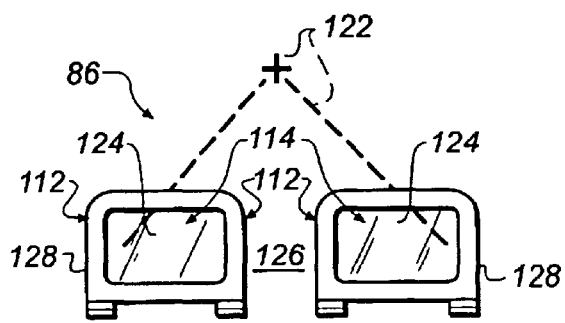
FIG. 4     FIG. 5
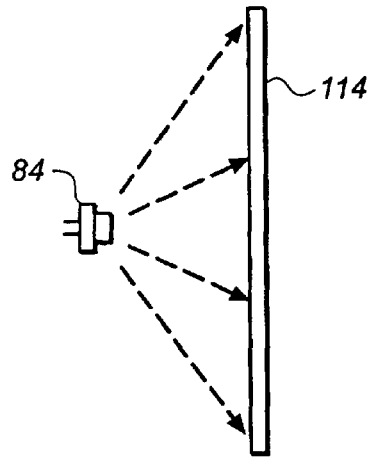
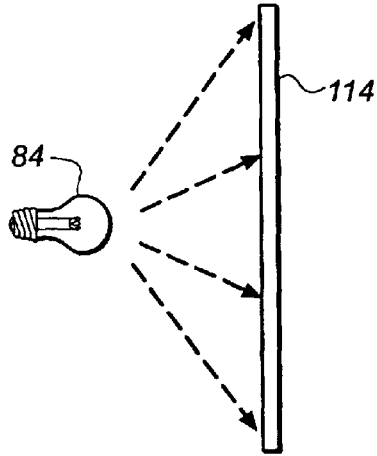
FIG. 6     FIG. 7
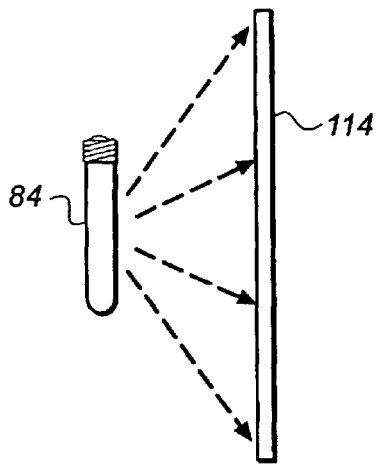
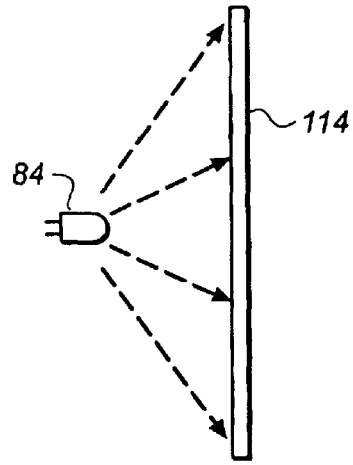
FIG. 8     FIG. 9

US 6,724,991 B1

BINOCULARLY VIEWABLE HOLOGRAPHIC VIEWFINDER AND CAMERA

FIELD OF THE INVENTION

The invention relates to cameras and photography and more particularly relates to a binocularly viewable holographic viewfinder and camera.

BACKGROUND OF THE INVENTION

Eyepiece-viewfinders of cameras present some difficulties for new photographers and persons wearing a facial encumbrance, such as a pair of eyeglasses, a diving mask, a costume mask, or, even a hat. A partial solution is increasing the size of the viewfinder eyepiece. This helps, but a relatively small increase in viewfinder eyepiece size is accompanied by a relatively large increase in camera size and weight. An alternative approach is described in U.S. Pat. No. 5,500,702 and U.S. Patent Application Publication No. US2001/0,016,084 A1. These publications disclose image capture devices that project marker beams toward a subject. Holographic optical elements are used as diffraction optical elements in the production of the marking beams. This approach is complex and is unsuitable for situations that present a risk of a marker beam appearing in a captured image. Such a situation occurs when many photographers shoot the same scene or overlapping scenes at the same time.

U.S. Pat. No. 6,125,239 discloses a camera viewfinder, which incorporates a holographic optical element that acts as a diffraction optical element. The holographic optical element is used to redirect light from an information display through an eyepiece to the photographer.

U.S. Pat. No. 5,978,607 discloses a camera having a viewfinder, in which a holographic element is interposed between the lenses of the viewfinder. Information and images can be projected onto the holographic element by a raster scanned light source. The holographic element can be permanently provided with framing radicals by etching or painting techniques or the like. Images of radicals can also be projected onto the holographic element by the scanned and modulated beam of the optical system.

The last two patents have the shortcoming that the user has to look through the eyepiece with one eye to see the viewfinder image. The earlier two patent publications, don't require looking through the viewfinder, but interfere with the scene.

It would thus be desirable to provide a camera and viewfinder in which marker beams are not projected toward a scene to be captured and the scene to be captured is visibly delimited and can easily be perceived with both eyes.

SUMMARY OF THE INVENTION

The invention is defined by the claims. The invention, in broader aspects, provides a camera and viewfinder. The camera has a body and a taking lens mounted to the body. The taking lens defines a subject field. A viewing window is joined to the body. The viewing window is transmissive of a light image of the subject field. The viewing window bears a holographic image of a reticle. A light source faces the viewing window and illuminates the holographic image. The reticle produced can be binocularly viewable, that is, viewable by the photographer with both eyes while the photographer looks through the viewing window to compose a scene image for picture taking.

It is an advantageous effect of the invention that a camera and viewfinder are provided in which marker beams are not projected toward a scene to be captured and the scene to be captured is visibly delimited and can easily be perceived with both eyes.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 1 is a front perspective view of an embodiment of the camera. Dashed line arrows in this and other figures indicate light emitted by the light source.

FIG. 2 is a cross-sectional view of the camera of FIG. 1 taken substantially along the section line 2—2 of FIG. 1. For simplicity, internal features of the body are not shown.

FIG. 4 is a rear view of the viewfinder of the camera of FIG. 1. Dashed lines indicate the perceived separation between the reticle, which has the shape of a centered cross, and the viewing window.

FIG. 5 is a rear view of the viewfinder of the camera of FIG. 3. Dashed lines indicate the perceived separation between the reticle, which has the shape of a centered cross, and the viewing window.

FIGS. 6–9 diagrammatically illustrate the viewing window and some alternative light sources.

DETAILED DESCRIPTION OF THE INVENTION

Figure 3:
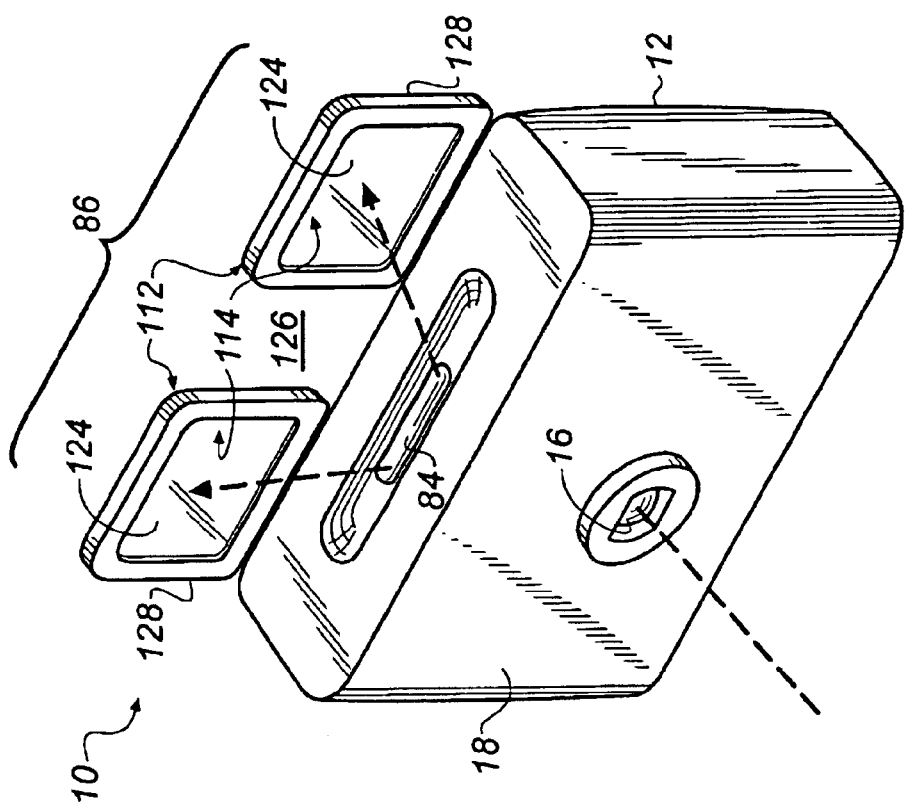
FIG. 3 is the same view as FIG. 1 of another embodiment of the camera.
Figures 10, 11, 12, 13, 14, 15, 16, 17, 18, 19, 20, 21:
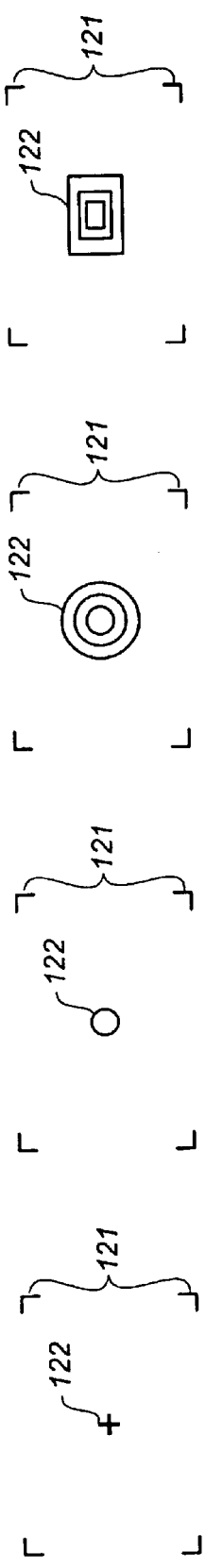
FIGS. 10–21 illustrate some alternative reticles.

Referring now to FIGS. 1–2 and 30–32, the camera 10 has a body 12 that holds a capture unit 14. A taking lens 16 having one or more optical elements, defines a subject field. A light image of a scene in the subject field is propagated by the taking lens 16 to the capture unit 14. Other characteristics of the taking lens 16 are not critical. For example, the taking lens 16 can be fixed focus or focusable and can have a single focal length or can be a zoom lens. The taking lens 16 defines opposed front and rear faces 18,20 of the body 12 and also defines an optical axis 22 (indicated by a dashed line in FIGS. 30–31). The capture unit 14 has a capture plane 24 opposite the taking lens 16 (indicated by a dashed line in FIG. 2).

Figure 30:
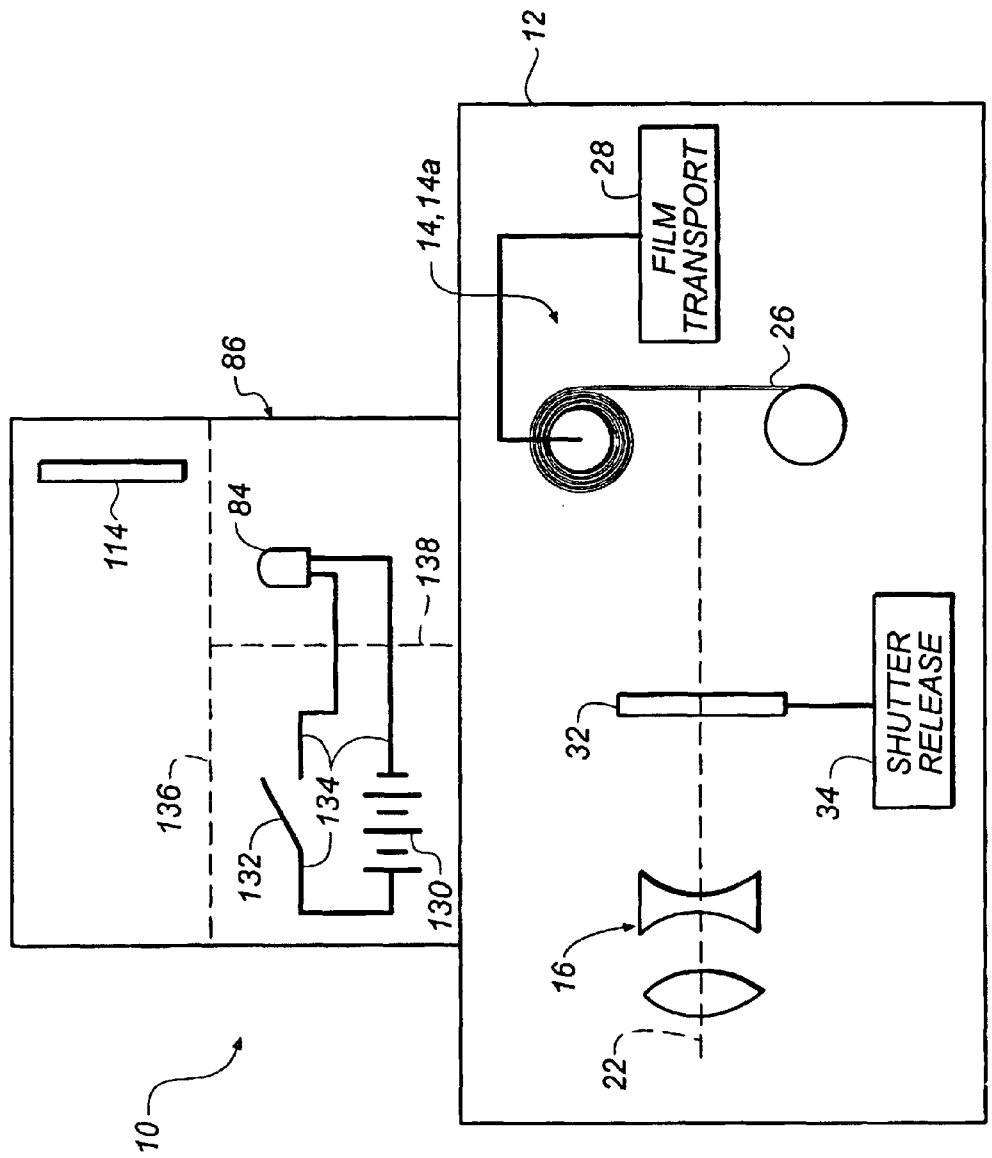
FIG. 30 is a diagrammatical view of an embodiment of the camera and viewfinder.
Figure 31:
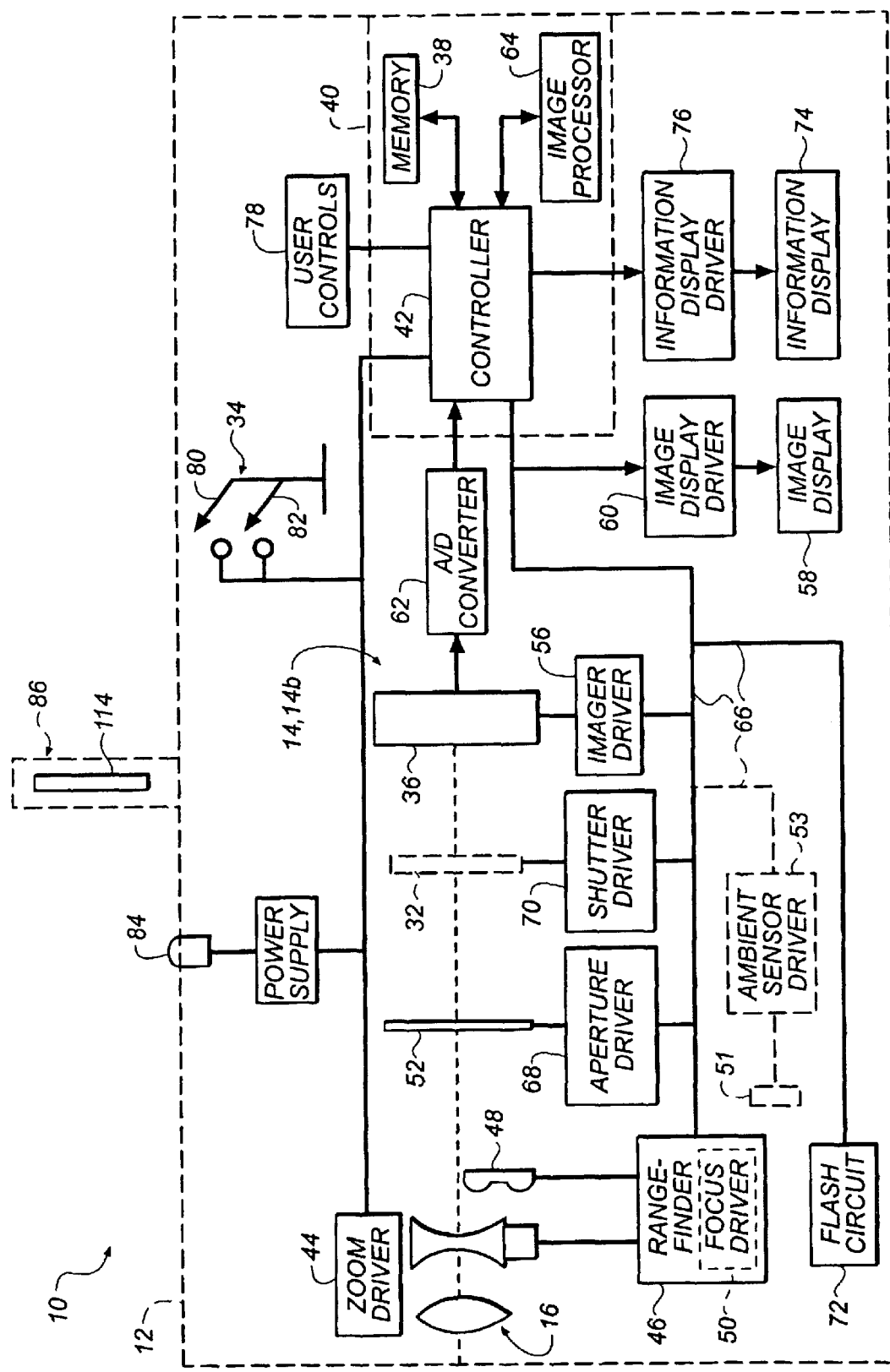
FIG. 31 is a simplified diagrammatical view of another embodiment of the camera having a digital capture system.
Figure 32:
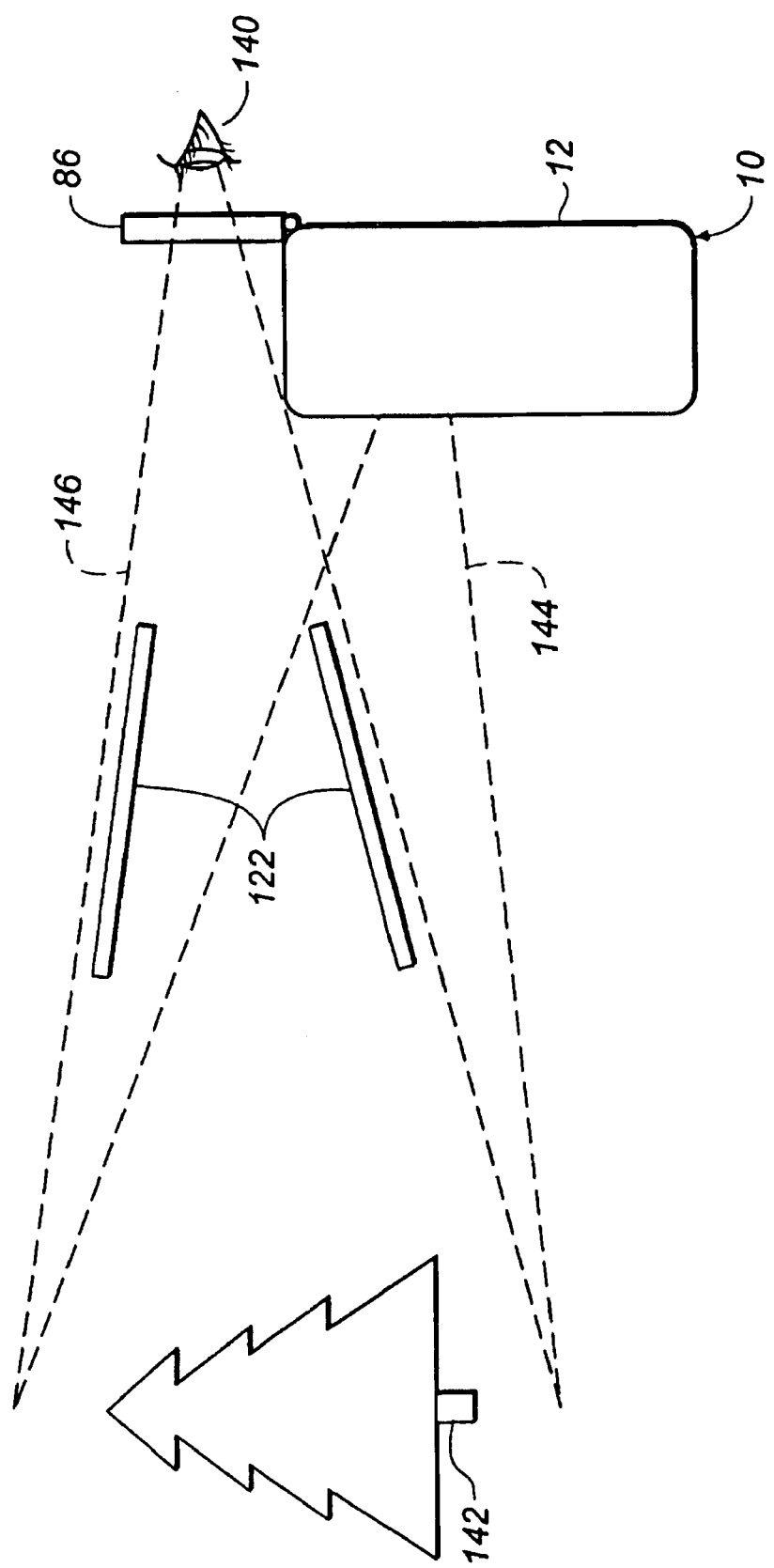
FIG. 32 is a diagrammatical view illustrating the images perceived by the photographer and captured by the camera. Dashed lines indicated the light images captured by the camera and seen by the photographer. The holographic image of the reticle that is seen by the photographer is illustrated by a pair of solid line bars.

The type of capture unit 14 used is not critical. Digital and film capture units are well-known to those of skill in the art. Schematic diagrams of two examples of capture units are shown in FIGS. 30–31. Referring initially to FIG. 30, in a film capture unit, photographic film is used as capture media. The film is typically in the form of an elongated filmstrip 26 and is transported, on a frame-by-frame basis through the capture plane 24, by a film transport 28. A film exposure capture unit 14a provides uniform exposures or variable exposures based upon scene conditions detected by one or more sensors (not shown) or by photographer selection. The film exposure unit 14a includes a shutter 32 that is operated by a shutter release 34. The film exposure unit 14a is inclusive of other exposure-related features (not shown), such as a constant or variable aperture plate or diaphragm, rangefinder, autofocus mechanisms and the like.

Referring to FIG. 31, a digital capture unit 14b is similar, but an electronic imager 36 replaces the photographic film 26, and memory 38 stores captured images electronically and/or magnetically, optically, or by other means. The imager 36 is under the direction of a control system 40 that includes the memory 38 and an appropriately programmed microprocessor or other control unit 42. The camera 10 can use a digital capture unit or a film capture unit or both, in alternation or simultaneously for film image capture with electronic verification.

The type of electronic imager 36 is highly preferred to be one of the several solid-state imagers available: such as a charge-coupled device ("CCD"), a CMOS imager or a charge-injection device ("CID"). The memory 38 may be fixed in the camera 10 or removable. The type of memory used and the manner of information storage, such as optical or magnetic or electronic, is not critical. For example, removable memory can be a floppy disc, a CD, a DVD, a tape cassette, or flash memory card or stick. The transfer of images in digital form can be on physical media or as a transmitted electronic signal.

In the embodiment shown in FIG. 31, the taking lens 16 is a motorized zoom lens in which a mobile element or elements are driven, relative to a stationary element or elements, by a zoom driver 44. The control system 40, which includes the control unit 42, can take the form of an appropriately configured microcomputer, such as an embedded microprocessor having RAM or other memory for data manipulation and general program execution.

The taking lens 16 unit of the embodiment of FIG. 31 is also autofocusing. An autofocusing system has a rangefinder 46 that includes a sensor 48. The rangefinder 46 operates a focus driver 50, directly or through the control system 40, to move one or more focusable elements (not separately illustrated) of the taking lens 16. Digital zooming (enlargement of a digital image equivalent to optical zooming) can also be used instead of or in combination with optical zooming.

The light path to the imager 36 has a diaphragm/aperture plate 52 and a shutter 32 that shutters the light path to the imager 36. The term "shutter" is used in a broad sense to refer to physical and/or logical elements that provide the function of allowing the passage of light along the light path to the imager 36 for image capture and disallowing that passage at other times. "Shutter" is thus inclusive of, but not limited to, mechanical and electromechanical shutters of all types and is also inclusive of computer software and hardware features of electronic array imagers that allow an imaging operation to be started and stopped under control of the camera control system. An ambient sensor 51 and ambient sensor driver 53 are optionally provided (indicated by dashed lines in FIG. 31), to sense ambient conditions and signal the control system, which then modifies aperature plate 52 and shutter 32 operation to change exposures.

The shutter 32 is illustrated by dashed lines, in FIG. 31, to indicate both the relative position of a mechanical shutter and the function of an electronic shutter. When using a CCD, electronic shuttering of the imager 36 can be provided by shifting the accumulated charge under a light shielded register provided at a non-photosensitive region. This may be a full frame as in a frame transfer device CCD or a horizontal line in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array.

The imager 36 receives a light image and converts the light image to an analog electrical signal, that is, an analog electronic image. (For convenience, film images and electronic images are generally discussed herein in the singular. Like considerations apply to film and digital video cameras and to each image of a plurality captured for a particular picture-taking event.) The electronic imager 36 is driven by an imager driver 56. An image display 58 that is mounted to the body 12 is driven by an image display driver 60 and produces a light image that is viewed by the user.

Different types of image display can be used. For example, the image display can be a liquid crystal display ("LCD"), a cathode ray tube display, or an organic electroluminescent display ("OELD"; also referred to as an organic light emitting display, "OLED").

The control system 40 controls components of the camera 10 and performs processing related to the derived image. The control system 40, as earlier discussed, includes the control unit 42 and memory 38 and also includes an analog to digital converter-amplifier 62 (labeled "A/D converter" in FIG. 31) and an image processor 64. Other components can also be provided, as discussed below, in detail. Suitable components for the control system 40 are known to those of skill in the art.

The captured analog electronic image is amplified and converted by the analog to digital converter-amplifier 62 to a digital electronic image, which is then processed in the image processor 64 and stored in the memory 38. It is currently preferred that signal lines 66 connecting the components act as a data bus. The control unit 42 includes a timing generator (not separately illustrated) that supplies control signals. The control unit 42 operates the memory 38 and the drivers including the zoom driver 44, focus driver 50, imager driver 56, image display driver 60, an aperture driver 68, and a shutter driver 70. The control unit 42 connects to a stroboscopic flash circuit 72 that provides flash functions.

One or more information displays 74 can be provided on the body 12, to present camera information to the photographer, such as exposures remaining, battery state, flash state, number of prints ordered, and the like. The information display 74 can be deleted if information is instead provided on the image display 58 as a superimposition on the image or alternately instead of the image (not illustrated). If separate, the information display 74 is operated by an information display driver 76.

The camera 10 has user input elements including the shutter release 34 and other user controls 78. (The latter two are discussed in detail below.) To take a picture, the shutter release 34 is actuated by the user and trips, first, from a set state to an intermediate state, and then to a released state. The shutter release 34 can be actuated by pushing a button, as is typical in cameras.

In the embodiment shown in FIG. 31, the shutter button is initially depressed through a "first stroke", to actuate a first switch 80 and alter the shutter release 34 from the set state to the intermediate state and is further depressed through a "second stroke", to actuate a second switch 82 and alter the shutter release 34 from the intermediate state to the released state. Like other two stroke shutter releases well known in the art, the first stroke actuates exposure-delimiting camera 10 components, such as autofocus, autoexposure, and flash unit readying; and the second stroke actuates capture of the archival image. The first stroke also activates a light source 84 (discussed below in detail).

Referring now to FIGS. 1–29 and 32, a viewfinder 86 is joined to the camera body 12. The location of the viewfinder 86 relative to the rest of the camera body 12 can be varied. The viewfinder 86 can be relatively central, near the taking lens 16, or peripheral. For most use, it is convenient if the viewfinder 86 extends outward and upward from the camera body 12.

Figure 29:
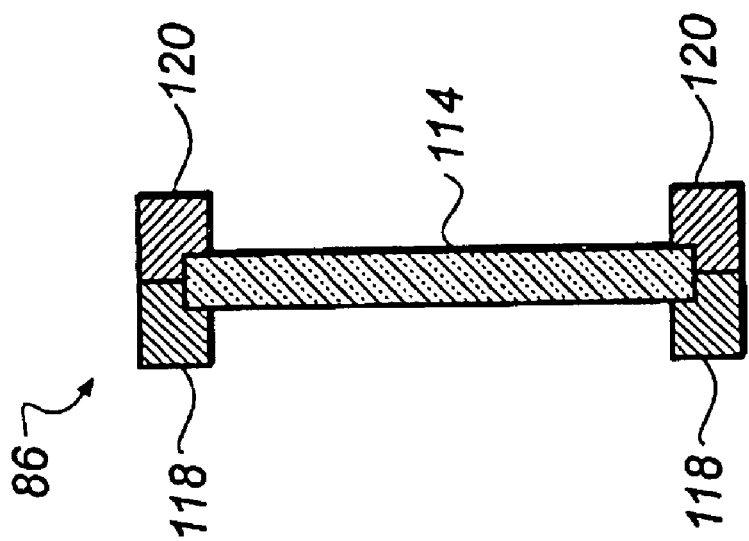
FIG. 29 is a cross-sectional view of another modification of the viewfinder of FIG. 1.
Figure 28:
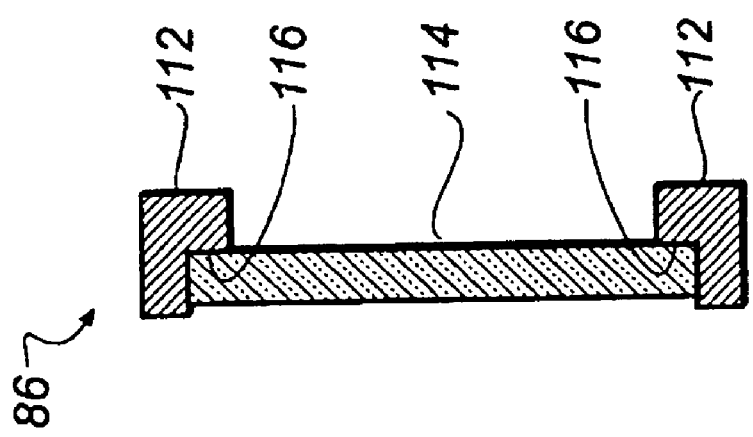
FIG. 28 is a cross-sectional view of a modification of the viewfinder of FIG. 1.

The viewfinder 86 includes a viewfinder surround 112 and a viewing window 114 held by the viewfinder surround 112. The viewfinder surround 112 supports the viewing window 114 and, to some extent, provides protection against impacts. The viewing window 114 is immobilized against the viewfinder surround 112. The manner in which the viewing window 114 is held is not critical. For example, FIG. 28 illustrates an embodiment, in which the viewing window 114 is press fit or adhered against an inside shoulder 116 of the viewfinder surround 112. FIG. 29 illustrates another embodiment, in which the viewing window 114 is trapped between halves 118, 120 of a two-piece viewfinder surround 112 that is assembled over the viewing window 114.

Additional structures can be provided to more completely support and protect the viewing window. For example, protective front and rear panels (not illustrated) of transparent glass or plastic can be provided on one or both sides of the viewing window. Alternatively, the viewing window and viewfinder surround can be formed as a single piece of polymer.

The viewfinder 86 can be permanently mounted to the camera body 12 or can be a separate piece that is attachable and detachable, as desired. In the embodiment of FIGS. 1–2, the viewfinder surround 112 of the viewfinder 86 is joined to the body 12 by a hinge 88 at the upper rear edge of the body 12. The viewfinder 86 is movable in directions indicated by double-headed arrow 100 between a use position illustrated in FIGS. 1–2 and a storage position (not shown), in which the viewfinder 86 is flat against the top of the body 12.

The viewfinder surround 112 of the viewfinder 86 can be joined to the body 12 so as to be reversibly releasable, by use of one or more releasable fasteners or the like. The type of fastener used is not critical. For example, hook and loop fasteners, screw on fasteners and snap fasteners can be used. In the embodiment shown in FIGS. 26–27, the viewfinder 86 has a pair of snap hooks 102 that are fixed to the viewfinder surround 112 and the body 12 has a pair of spaced apart snap loops 104. The viewfinder 86 is assembled on the camera 10 by pressing the snap hooks 102 through the snap loops 104. Resilient arms 106 of the snap hooks 102 bend and then snap back when the loops 104 have been cleared. Free ends 108 of the arms 106 are located so as to then bear against the snap loops 104 and hold the viewfinder 86 in place. The viewfinder 86 is released by pressing the arms 106 so as deflect the free ends 108 away from the loops 104, and then pushing the viewfinder 86 away from the body 12.

The viewfinder 86 can be used in an underwater camera. In this case, the outermost members of the camera 10 are resistant to water intrusion and, for some uses, are resistant to pressure. In the embodiment shown in FIGS. 24–25, a camera 10 having a viewfinder 86 that is integral with the body 12 is held within an outer waterproof housing 110. For convenience in illustration, the housing 110 is simplified and water resistant fittings for the shutter button and other controls are not illustrated. Water-resistance and pressure resistance can alternatively be provided separately by the body 12 and the viewfinder surround 112.

Figure 23:
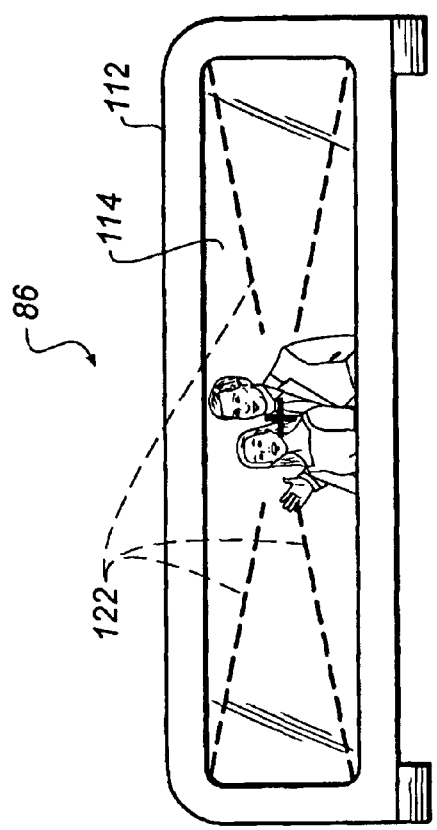
FIG. 23 is a semi-diagrammatical rear view of the viewfinder of FIG. 22 showing a representation of the three dimensional scene and reticle that would be seen by the photographer in FIG. 22.
Figure 22:
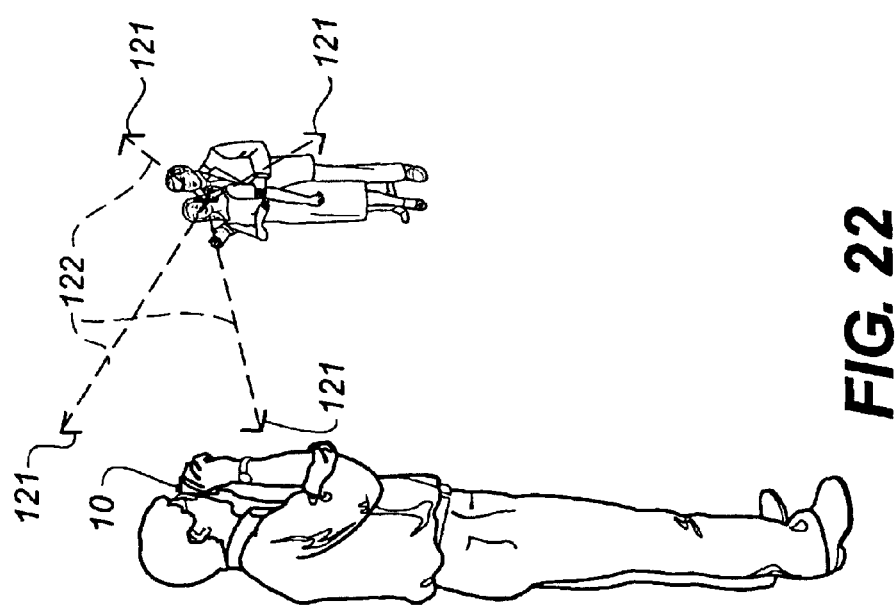
FIG. 22 is a semi-diagrammatical view of a photographer using a modification of the camera of FIG. 1. The reticle is shown, but it will be understood that this diagrammatically illustrates what the photographer sees, not what is visible to an observer. This embodiment of the camera is like FIG. 1, but has a different reticle.
Figure 25:
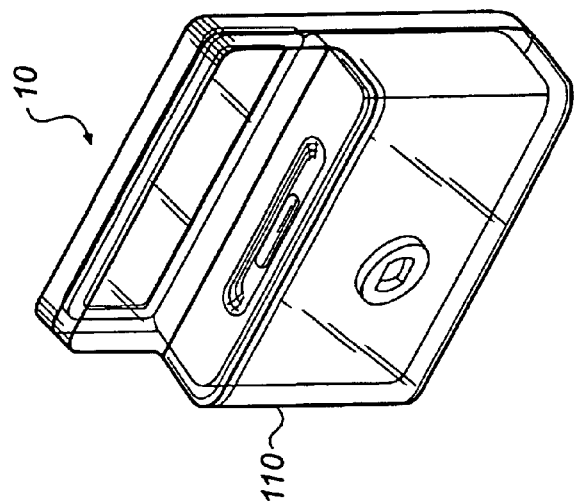
FIG. 25 is a front perspective view of the camera of FIG. 24.
Figure 24:
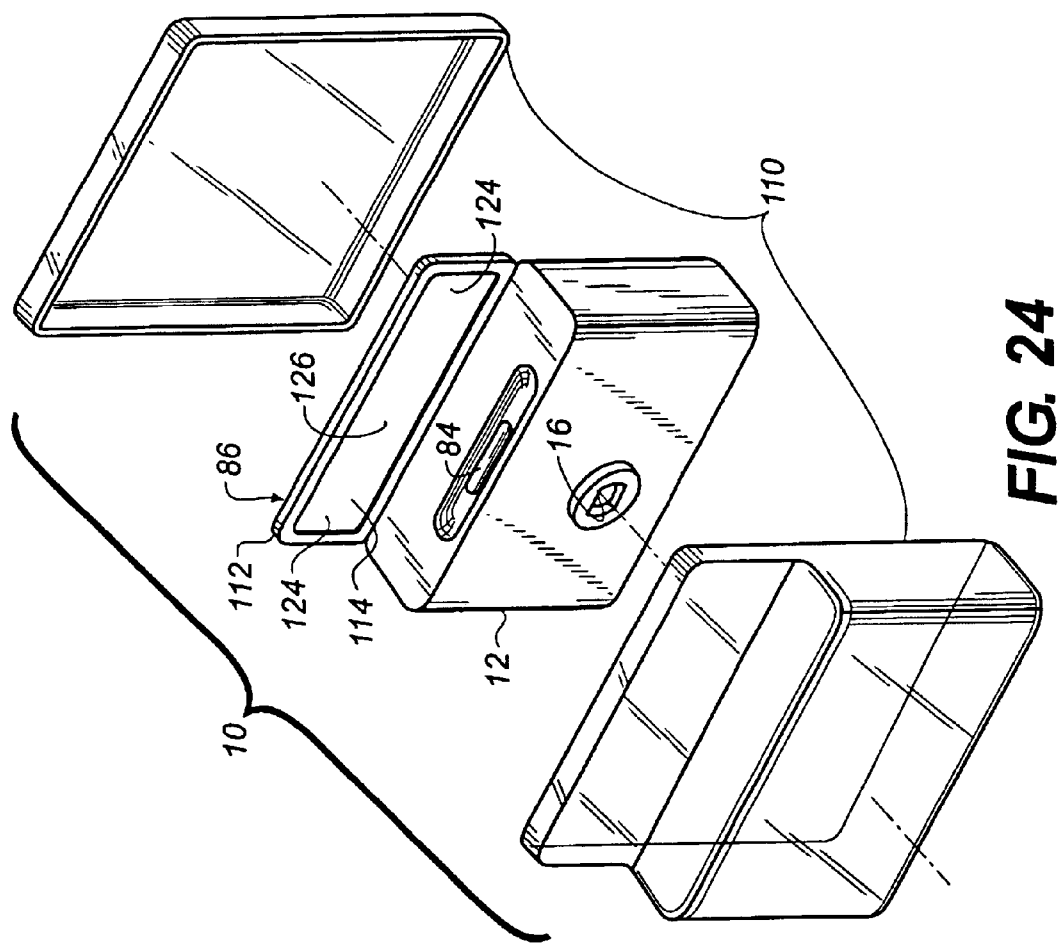
FIG. 24 is a partially exploded, front perspective view of another embodiment of the camera.

Referring now to FIGS. 4–5, 10–23, and 32 the viewing window 114 is a reflection hologram or transmission hologram that bears a holographic image of a reticle 122. The viewing window is transmissive of a light image of the subject field. The photographer 140 (illustrated as an eye) looks through the hologram to compose the scene 142 (illustrated as a tree) for capture of a light image 144 in the camera 10. The photographer 140 sees the holographic image of the reticle 122 (shown as elongated bars in FIG. 32) imposed on a light image 146 of the scene 142. The viewing window and the reticle 122 are aligned with the optical axis 22 of the taking lens 16. The reticle 122 delimits and/or sights the subject field in the transmitted light image of the scene. In the embodiments of FIGS. 4–5, the reticle is a three-dimensional image of a pair of dashed lines that recede away from the photographer to a central cross. A similar reticle is shown in FIGS. 22–23, in which two pair of dashed lines recede, away from the photographer, toward a central cross.

The viewing window 114 can be an absorption hologram produced by use of ordinary photographic film and conventional film development; however, absorption holograms have the shortcoming of relatively high density. This makes it difficult for the user to see the scene through the hologram. It is preferred therefore, that the hologram is a phase hologram, in which the holographic image is provided by a modulation of the index of refraction or surface relief. For example, procedures can be employed in which silver particles an emulsion layer of the hologram are bleached to convert them into transparent silver salts. The resulting phase hologram can be cloudy, but is readily prepared so as to be transparent enough to allow use under most picture taking conditions. Procedures for preparing phase holograms are well-known to those of skill in the art.

The reticle 122 shown in the hologram can be a holographic photograph of a physical object or can be computer-generated. Since a hologram is used, the object or apparent object is not limited to two dimensions. A reticle 122 that appears to be three-dimensional is advantageous to the user, because it allows the user to move easily line up a scene image, particularly under difficult conditions, such as underwater. An example of this is shown in FIGS. 22–23, which attempt to portray what is seen by a user, looking through this viewing window 114. The dashed lines of the reticle 122 extend to, but not through the image area. In FIGS. 10–22, corners of the viewing window 114 are represented diagrammatically by chevrons 121.

Procedures for preparing holograms that appear three-dimensional are well-known to those of skill in the art. Holograms of reticles 122 can be prepared by holographically photographing reflectors against a nonreflective background. The reflectors can be positioned for a far field (Fraunhofer) hologram. For example, the viewing window 114 shown in FIGS. 22–23, can be provided by holographically photographing linear reflectors that have relatively long major dimensions (1–2 meters or more) and are positioned at oblique angles to the optical axis 22. Nonreflective interruptions in the reflective material provide dashed lines. The central cross can be flat or can be provided with a noticeable thickness in the direction of the optical axis 22. This would allow the central cross to appear two-dimensional when the line of sight of the user was skewed relative to the viewing window 114 and optical axis 22.

The shape of the reticle 122 is not critical. FIGS. 10–21 illustrate a number of different reticles 122. Some of the reticles 122 indicate a portion of the scene viewable through the viewing window 114 that will appear in a captured image. Others do not and only sight, that is, provide an indication of the center of the image.

It is preferred that a field of view delimited by the reticle 122 be matched to the field of view of the capture unit 14. It is common practice, to provide a variation between the field of view of a viewfinder and the field of view of a capture unit. With conventional viewfinders, the scene delineated by the viewfinder is typically 80 to 95 percent of the field of view of the capture unit. The difference ensures that everything the photographer sees will be captured in the archival image, albeit with some additional image content at the edges. The same practice can be followed in defining the limits of the reticles 122 of the cameras described herein; however, for convenience in describing the invention, cameras 10 are generally described and illustrated herein in terms of reticles 122 that define a scene image having a 100 percent match to the field of view of the archival image capture unit (film or digital). This is a matter of convenience in describing the invention. The reticles 122 of the cameras 10 can be limited to 80 to 95 percent of the field of view of the capture unit 14 without changing the other features described.

If the viewfinder 86 is pivotable relative to the body 12, then proper pivoting of the viewfinder 86 into the use position is required to provide correct alignment. Features can be provided that encourage correct usage. For example, detents (not shown) can be provided for use and folded positions or an over-center mechanism (not shown) can be provided to bias the viewfinder toward use and folded positions. Similarly, the viewing window can have a thick hologram, in which positioning at a Bragg angle relative to a reconstructing beam is required to view the hologram. In this case, the photographer can be instructed to continue pivoting of the viewfinder 86 relative to the body 12 until the appropriate Bragg angle is reached.

It is highly preferred that the hologram presents a reticle image that appears three-dimensional to the photographer. As a consequence of this, it is preferred that the viewing window 114 is binocularly viewable. This sets practical limits for the dimensions of the viewing window 114. Binocularly viewable viewing windows 114 have a length that is greater than the pupil-to-pupil separation of the eyes of an expected or average user. It is convenient to make this dimension the largest dimension of the viewing window 114. Practical dimensions for the length and height of the viewing window 114 are 15 mm to 120 mm in length and 5 mm to 20 mm in height. Additional height can be provided, but is not generally useful. The thickness of the viewing window 114 is 0.2 mm to 2 mm.

The photographer holds the viewing window 114 close to his or her eyes when composing a scene. As a result, the viewing window 114 is divided into a pair of panes 124 that the user ordinarily looks through during use, separated by an interregion 126 that the user does not ordinarily look through during use. The interregion 126 can be a continuous portion of the hologram, or can be blanked out or fully transparent, or can be a void as a shown in FIG. 2. In that embodiment, the two panes 124 of the viewing window 114 are discrete and separated. The viewfinder surround 112 has two subparts 128. Each subpart 128 supports and provides protection for the respective pane 124 of the viewing window 114. In the embodiment shown in FIG. 2, the two panes 124 of the viewing window 114 are each pivotable relative to the body 12 of the camera 10. It is convenient, if the two subparts 128 are yoked together so as to pivot as a single piece.

The viewfinder 86 has a light source 84 that is directed toward the viewing window 114. The light source 84 is selected so as to be appropriate for visualizing the hologram of the viewing window 114. For example, specific wavelength monochromatic light sources are required for some holograms. Other holograms can be visualized with white light or monochromatic light of a non-specific wavelength. The light source 84 can otherwise be selected so as to best to conform with the other camera 10 requirements. FIGS. 6–9 illustrated different light sources 84: a light emitting diode (LED), an incandescent bulb, a fluorescent tube, and a neon bulb, respectively. Other types of light sources 84 can also be used.

If a light source 84 having a relative high light output is used, then it is desirable to limit that output with a gain control, so as to provide substantially constant light output and prevent excessive battery usage. An example of a suitable gain control is disclosed in U.S. Pat. No. 5,515,392, entitled "LASER DIODE CONTROL CIRCUIT WITH POWER SUPPLY COMPENSATION NETWORK", which is hereby incorporated herein by reference.

In the figures, the light source 84 is shown centered relative to the viewing window 114. The light source 84 can be shifted parallel to the length dimension of the viewing window 114, if desired. Multiple light sources 84 of the same or different types can be used. Light can also be propagated from a lamp to the viewing window 114 via a light pipe or other waveguide (not shown).

Figure 26:
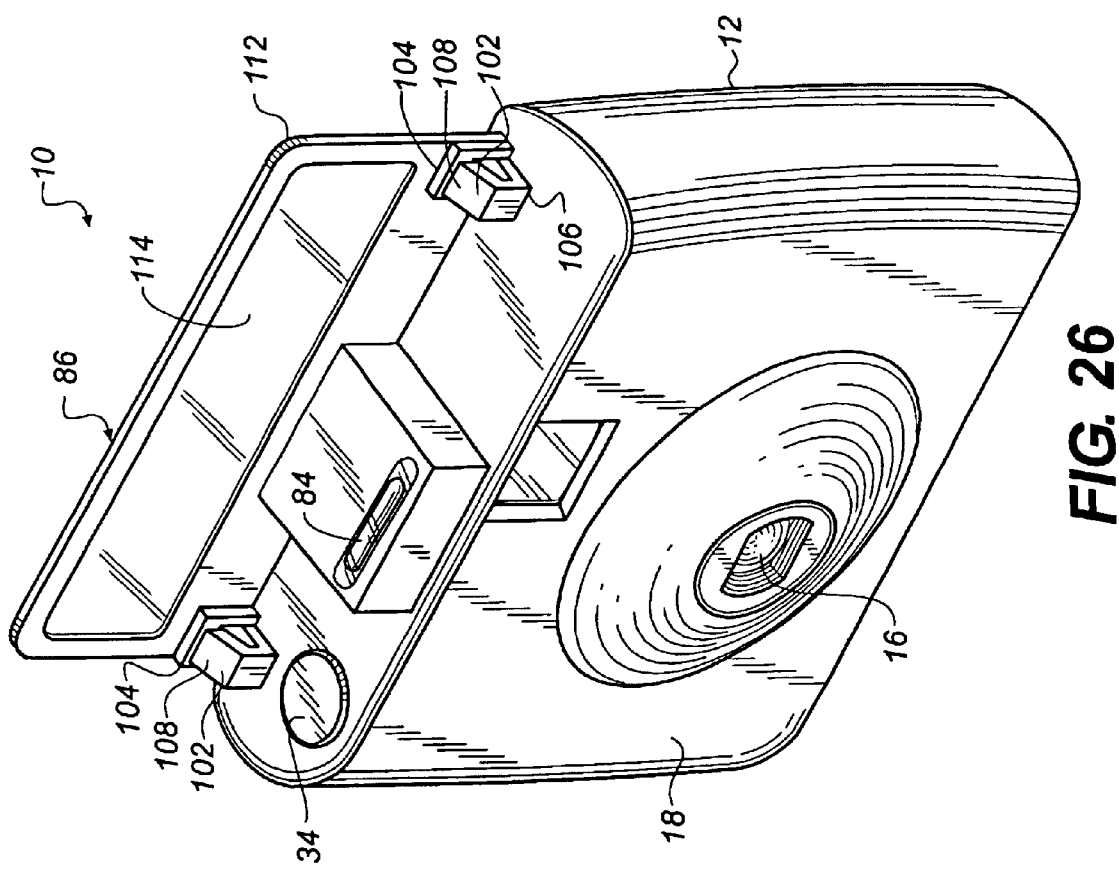
FIG. 26 is a front perspective view of another embodiment of the camera, which includes a detachable holographic viewfinder. The viewfinder is shown in an attached state.

The light source 84 can be mounted in the body 12, as shown in FIGS. 1 and 3, or can be mounted in a portion of the viewfinder 86 as shown in FIG. 26. The light source 84 faces the viewing window 114 on the appropriate side for the type of hologram used. For a transmission hologram, the light source 84 is mounted forward of the viewing window 114 and light is transmitted through the viewing window 114 to visualize the reticle 122. For a reflection hologram, the light source 84 is positioned rearward of the viewing window 114 and light is reflected off the hologram to the user.

The light source 84 can be mounted to the body 12 of the camera 10 as illustrated in FIGS. 1 and 3 or can be mounted to the viewfinder 86 as shown in FIG. 26. The light source 84 is connected to a power supply 130, such as a battery, and is operated via a switch 132 (as shown in FIG. 30) or through the control system 40.

The power supply 130 and the switch 132 can be provided in the viewfinder 86 or in the body 12 of the camera 10. This is illustrated diagrammatically in FIG. 30. The viewfinder 86 includes a light source 84, power supply 130, switch 132, and conductors 134 that complete the circuit. The viewfinder 86 is joined to the body 12 of a film camera 10. A horizontal dashed line 136 in the viewfinder 86 indicates that components below that line, that is, the light source 84, power supply 130, switch 132, and conductors 134, could be moved to the body 12 of the camera 10. A vertical dashed line 138 indicates another alternative, in which the light source 84 is part of the viewfinder 86 and the power supply 130 and switch 132 are part of the body 12. Conductors 134 and connectors (not separately indicated) are provided as needed to complete the circuit. The embodiment of the camera shown in FIG. 31 can be modified in a like mariner.

Figure 27:
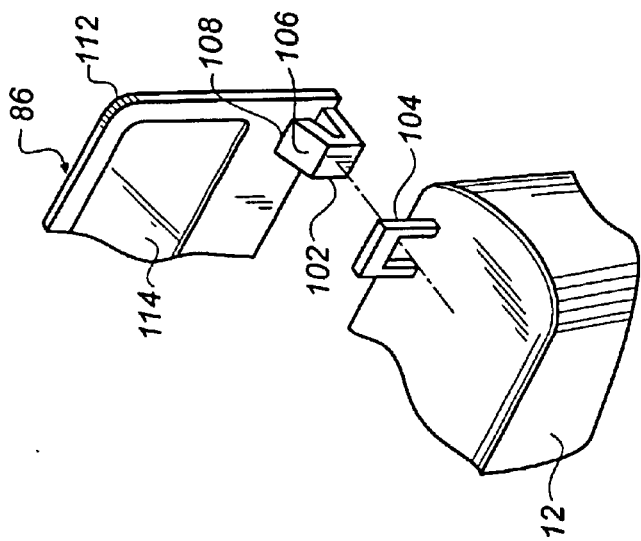
FIG. 27 is a partial front perspective view of the camera of FIG. 26 showing the photographic viewfinder in a detached state.

In the embodiment shown in FIGS. 26–27, the light source 84 is mounted to and integral with the viewfinder surround 112. A power supply 130 and other circuit components can also be included within the viewfinder 86.

The viewfinders 86 disclosed herein are simple and convenient, but provide limited information that does not change. Additional information can be provided, if desired. For example, a head-up display unit can be included in the viewfinder 86 along with the panes 124 of the viewing window 114. Such a head-up display can utilize a hologram to deflect light from a liquid crystal device or other display panel and, as disclosed in U.S. Pat. No. 5,892,598, entitled "HEAD UP DISPLAY UNIT, LIQUID CRYSTAL DISPLAY PANEL, AND METHOD OF FABRICATING THE LIQUID CRYSTAL DISPLAY PANEL", which is hereby incorporated herein by reference. The viewing window 114 can have, in addition to a pair of panes 124 having a reticle 122, other areas with different holograms or other display features. The light source 84 can also be like those in U.S. Pat. No. 5,892,598 and can be shared by the panes 124 of the viewing window 114 and the head-up display.

The invention has been described in detail with particular reference to certain preferred embodiments thereof, but it will be understood that variations and modifications can be effected within the spirit and scope of the invention.

What is claimed is:

1. A camera comprising:
   a body;
   a taking lens mounted to said body, said taking lens defining a subject field;
   a viewing window joined to said body, said viewing window being transmissive of a light image of said subject field, said viewing window bearing a holographic image of a reticle; and
   a light source facing said viewing window to illuminate said holographic image;
   wherein said light image and said reticle are binocularly viewable.

2. The camera of claim 1 wherein said viewing window is at least 50 mm wide.

3. The camera of claim 1 wherein said viewing window has a pair of separated panes.

4. The camera of claim 1 wherein viewing window is a phase hologram.

5. The camera of claim 1 wherein said reticle indicates the center of said subject field.

6. The camera of claim 5 wherein said viewing window has two spaced apart panes.

7. The camera of claim 1 wherein said viewing window is a reflection hologram.

8. The camera of claim 1 wherein said viewing window is a transmission hologram.

9. The camera of claim 1 further comprising a shutter mechanism having a shutter shuttering said taking lens and a shutter release operatively connected to said shutter, said shutter release having a ready state, wherein said light source is de-actuated and said shutter is closed, a preparation state, wherein said light source is actuated and said shutter is closed, and an image capture state, wherein said shutter is momentarily opened.

10. The camera of claim 1 wherein said body encloses an internal space and said viewing window is external to said space.

11. The camera of claim 10 further comprising a viewfinder surround holding said viewing window, said viewfinder surround joining said viewing window to said body, said viewfinder surround being reversibly detachable from said body.

12. The camera of claim 1 wherein said light source is disposed in said viewfinder surround.

13. A camera comprising:
   a body;
   a taking lens mounted to said body, said taking lens defining a subject field;
   a viewing window joined to said body, said viewing window being transmissive of a light image of said subject field, said viewing window bearing a holographic image of a reticle; and
   a light source facing said viewing window to illuminate said holographic image;
   wherein said viewing window has a pair of separated panes.

14. A camera comprising:
   a body;
   a taking lens mounted to said body, said taking lens defining a subject field;
   a viewing window joined to said body, said viewing window being transmissive of a light image of said subject field, said viewing window bearing a holographic image of a reticle; and
   a light source facing said viewing window to illuminate said holographic image;
   wherein said light source is disposed in said viewfinder surround.

15. The camera of claim 14 wherein said viewfinder surround includes a power source connected to said light source.

16. A camera comprising:
   a body;
   a taking lens mounted to said body, said taking lens defining a subject field;

a viewing window joined to said body, said viewing window being transmissive of a light image of said subject field, said viewing window being a Fraunhofer hologram having an image of a reticle, said light image and said image of said reticle both being binocularly viewable; and a light source facing said viewing window to illuminate said hologram.

17. The camera of claim 16 wherein said body encloses an internal space and said viewing window is external to said space.

18. The camera of claim 17 wherein said viewing window is reversibly detachable from said body.

19. The camera of claim 17 further comprising a viewfinder surround releasably joining said viewing window to said body, said viewfinder surround holding said viewing window and said light source.

20. The camera of claim 19 wherein said viewfinder surround includes a power source connected to said light source.

21. The camera of claim 16 further comprising a shutter mechanism having a shutter shuttering said taking lens and a shutter release operatively connected to said shutter, said shutter release having a ready state, wherein said light source is deactuated and said shutter is closed, a preparation state, wherein said light source is actuated and said shutter is closed, and an image capture state, wherein said shutter is momentarily opened.

22. A holographic viewfinder for use with a camera, said viewfinder comprising:

a viewing window having a holographic image of a reticle and an optically transmissive viewfinder image area within said reticle;

a viewfinder surround holding said viewing window;

a connector adapted to join said viewfinder to said camera; and a light source disposed in said viewfinder surround, said light source being directed toward said viewing window.

23. The viewfinder of claim 22 further comprising a power source disposed in said viewfinder surround, said power source being operatively connected to said light source.

24. A holographic viewfinder for use with a camera, said viewfinder comprising:

a viewing window having a holographic image of a reticle and an optically transmissive viewfinder image area within said reticle;

a viewfinder surround holding said viewing window; and a connector adapted to join said viewfinder to said camera;

wherein said viewfinder image area and said reticle are binocularly viewable.

25. The camera of claim 24 wherein said light source is disposed in said viewfinder surround.

* * * * *